US012722088B2

(12) United States Patent
Boyles

(10) Patent No.: US 12,722,088 B2
(45) Date of Patent: Sep. 1, 2026

(54) SYSTEMS AND METHODS FOR CUSTOMIZED NON-FUNGIBLE TOKENS CORRESPONDING TO AN AMUSEMENT PARK ATTRACTION

(71) Applicant: Universal City Studios LLC, Universal City, CA (US)

(72) Inventor: Jeffrey Scott Boyles, Winter Park, FL (US)

(73) Assignee: Universal City Studios LLC, Universal City, CA (US)

( * ) Notice: Subject to any disclaimer, the term of this patent is extended or adjusted under 35 U.S.C. 154(b) by 256 days.

(21) Appl. No.: 17/864,948

(22) Filed: Jul. 14, 2022

(65) Prior Publication Data

US 2023/0022844 A1 Jan. 26, 2023

Related U.S. Application Data

(60) Provisional application No. 63/224,749, filed on Jul. 22, 2021.

(51) Int. Cl.

| | |
|---|---|
| ***A63F 13/79*** | (2014.01) |
| ***A63F 13/85*** | (2014.01) |
| ***G06T 19/00*** | (2011.01) |

(52) U.S. Cl.

CPC .............. *A63F 13/79* (2014.09); *A63F 13/85* (2014.09); *G06T 19/006* (2013.01)

(58) Field of Classification Search

CPC ......... A63F 13/79; A63F 13/85; G06T 19/009

See application file for complete search history.

(56) References Cited

U.S. PATENT DOCUMENTS

| | | | | |
|---|---|---|---|---|
| 6,526,158 | B1 * | 2/2003 | Goldberg | G06F 16/58 707/E17.026 |
| 10,540,654 | B1 * | 1/2020 | James | G06Q 20/223 |
| 10,715,329 | B1 | 7/2020 | Wellman | |
| 10,832,522 | B2 | 11/2020 | Simons | |
| 10,881,954 | B2 | 1/2021 | Auterio et al. | |
| 10,964,163 | B2 | 3/2021 | Larimer | |
| 11,032,072 | B2 | 6/2021 | Andon et al. | |
| 2005/0052532 | A1 | 3/2005 | Elooz et al. | |
| 2011/0298824 | A1 * | 12/2011 | Lee | A63F 13/327 345/633 |
| 2012/0162436 | A1 | 6/2012 | Cordell et al. | |
| 2012/0295710 | A1 * | 11/2012 | Barney | A63F 13/219 463/37 |
| 2020/0005284 | A1 * | 1/2020 | Vijayan | H04L 9/3247 |
| 2020/0193706 | A1 * | 6/2020 | Yeh | A63F 13/428 |

(Continued)

OTHER PUBLICATIONS

PCT/US2022/037797 International Search Report and Written Opinion mailed Oct. 17, 2022.

*Primary Examiner* — Jasson H Yoo

(74) *Attorney, Agent, or Firm* — Fletcher Yoder P.C.

(57) ABSTRACT

An attraction system of an amusement park includes a sensor configured to detect an activity of a user in an interactive attraction area. The attraction system also includes a controller including one or more processors. The one or more processors is configured to receive an indication of the activity from the sensor. The one or more processors is also configured to initiate capture of a piece of digital media via the sensor or a separate sensor in response to receiving the indication, and mint a non-fungible token (NFT) associated with the piece of digital media.

21 Claims, 2 Drawing Sheets

(56) References Cited

U.S. PATENT DOCUMENTS

Figure 1:
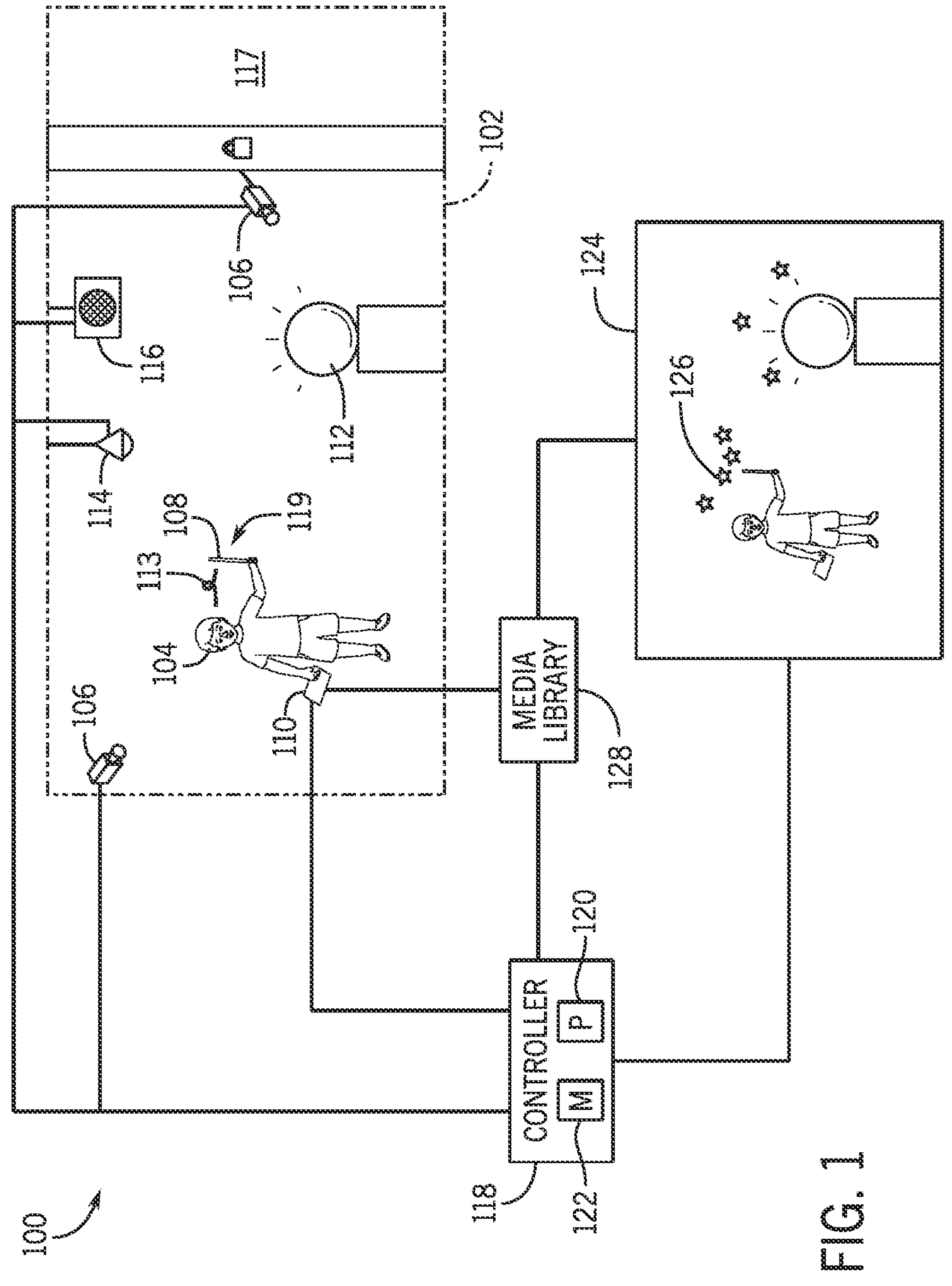

2020/0302188 A1* 9/2020 Iwai .......................... G06T 7/60
2021/0138965 A1 5/2021 Ugrin et al.
2021/0304196 A1* 9/2021 Patterson ............. G06Q 50/184

* cited by examiner

SYSTEMS AND METHODS FOR CUSTOMIZED NON-FUNGIBLE TOKENS CORRESPONDING TO AN AMUSEMENT PARK ATTRACTION

CROSS-REFERENCE TO RELATED APPLICATIONS

This application claims priority to and the benefit of U.S. Provisional Application No. 63/224,749, entitled "SYSTEMS AND METHODS FOR CUSTOMIZED NON-FUNGIBLE TOKENS CORRESPONDING TO AN AMUSEMENT PARK ATTRACTION," filed Jul. 22, 2021, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks often include interactive areas, including rides and attractions. Interactive areas may produce effects in response to user inputs, producing a user experience that is unique for the user. Interactive areas may generate great memories for guests. In view of such experiences and memories, it is now recognized that it is desirable to provide unique products based on such experiences and memories.

BRIEF DESCRIPTION

Certain embodiments commensurate in scope with the originally claimed subject matter are discussed below. These embodiments are not intended to limit the scope of the disclosure. Indeed, the present disclosure may encompass a variety of forms that may be similar to or different from the embodiments set forth below.

In accordance with an embodiment, an attraction system of an amusement park includes a sensor configured to detect an activity of a user in an interactive attraction area. The attraction system also includes a controller including one or more processors. The one or more processors are configured to receive an indication of the activity from the sensor. The one or more processors are also configured to initiate capture of a piece of digital media and data via the sensor or a separate sensor in response to receiving the indication, and mint the digital media and data as a non-fungible token (NFT).

In accordance with an embodiment, a method for operating an attraction system of an amusement park includes receiving, via a sensor, a first indication of a user of an attraction performing an activity. The activity comprises interacting with an attraction area using a reference object. The method also includes operating an interactive feature of the attraction area to produce a first effect via a controller and initiating capture of digital media representative of the first effect or the user performing the activity and the first effect. The digital media comprises a still image, video, animation, GIF, or audio. The method further includes incorporating augmentation media into the digital media. The augmentation media comprises augmented reality (AR) elements imposed over the digital media. The method may further include storing data associated with the activity, including participant information, record of completion, scores, rewards, and achievements. The method further includes storing the digital media and related data in a media library associated with the user, receiving a user input indicating that the user would like to mint a non-fungible token (NFT) representing the digital media, and minting an NFT representing the digital media that may further include a payload of related data or a smart contract. The NFT may be used in the attraction system to track progression or accomplishments in the interactive attraction area, or for entitlements or payments.

DRAWINGS

Figure 2:
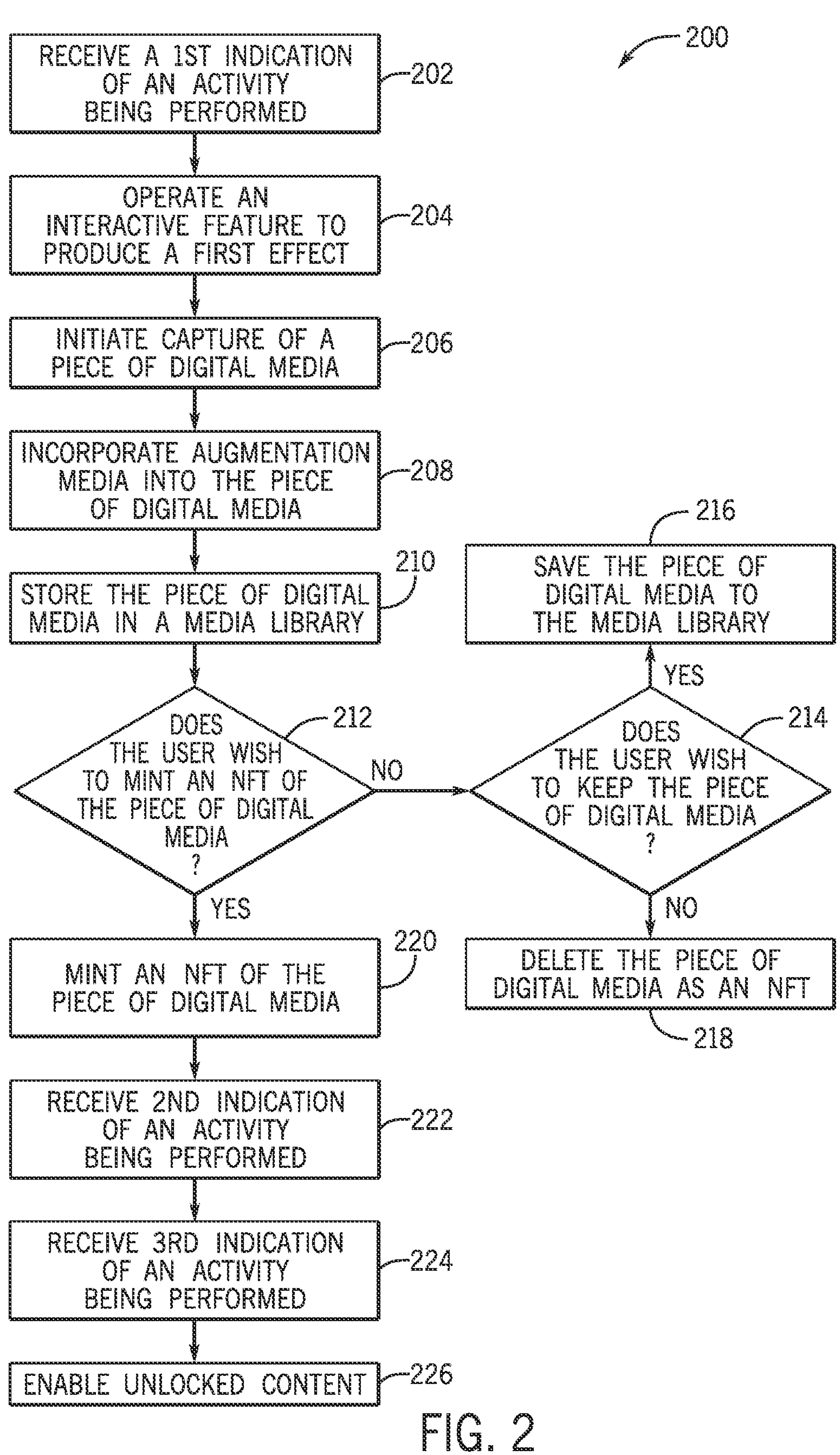

These and other features, aspects, and advantages of the present disclosure will become better understood when the following detailed description is read with reference to the accompanying drawings in which like characters represent like parts throughout the drawings, wherein:

FIG. 1 is schematic diagram of a system for minting customized non-fungible tokens in an amusement park attraction, in accordance with an aspect of the present disclosure; and FIG. 2 is a block diagram illustrating a method for minting customized non-fungible tokens in an amusement park attraction, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Amusement parks may include attractions configured to be interactive. That is, operation of the attraction may vary based on qualities and actions of a user. For example, an attraction may include a lighting system and a sound effect system that produce environmental effects, which can be changed based on user activity. As a specific example, a user may move a reference object (e.g., a toy sword, wizard staff, or wand) in various path shapes, and each shape (or gesture) may be detected by a control system (e.g., via a camera of a control system) and, in response, the control system may cause the lighting system and sound system to create different environmental effects. In accordance with the disclosed embodiments, a system associated with an attraction may produce user-customized items for users to keep as souvenirs or to be used as entitlements. For example, an attraction system may capture an image of a user interacting with the attraction, including effects generated as a result of the user interaction. The image may be a digital image that may be downloaded directly to a user device, including the user's reference object, or to a user account in the cloud. However, mere digital images may not impart the same feeling of ownership that physical photographs do.

Non-fungible tokens (NFTs) are uniquely identifiable assets consisting of digital data on a distributed ledger, including a blockchain or a hashgraph. NFTs often contain references to digital media files or physical objects that can be stored off-chain, and can include metadata and smart contracts. A smart contract is generally an automatically executing program or protocol stored on the distributed ledger as a part of the NFT or referred to by the unique identifier of the NFT. In an embodiment, a smart contract may be stored in metadata associated with the NFT. Ownership of NFTs is recorded on the blockchain or other distributed ledger, and can be transferred, providing for the tokenization of the digital media or physical objects referenced. An NFT, being certifiably unique, may impart a feeling of ownership similar to a unique physical object, such as a physical photograph or a collectable. Accordingly, the disclosed embodiments are directed to systems and methods for minting customized NFTs corresponding to an amusement park attraction based on user experiences. An attraction system may mint an NFT that captures a unique activity or experience of an individual user, that may include the user or certain elements of the experience, including elements of the experience unique to the user (e.g., performance, gestures, accomplishments, or creations). The NFT may reference and represent any digital media, which may contain augmented reality (AR) elements to enhance the visual experience of the user. For example, a gesture may be tracked by a sensor, and a trailing light effect specific to the path of the user gesture might be generated. The attraction system may recognize possession of an NFT in a file storage or library (e.g., a digital wallet) associated with the user and initiate certain experiences based on the identity or characteristics of the NFT. Upon detecting that a user is in possession of an NFT, the attraction system may generate previously unseen effects to ensure a novel experience for users that have visited the attraction before. Additionally, the attraction system may grant access to new areas for users in possession of a particular NFT having particular digital data. Further, NFTs acquired through such experiences may be utilized outside of the amusement park. For example, NFTs may be bought or sold in marketplaces or utilized to grant access to other experiences. For example, once authenticated (e.g., via a console, computer, website, or the like), an NFT acquired in a particular amusement park experience may allow access to new material (e.g., a new level or character) in a video game, which may have some relationship (e.g., thematically) to the amusement park experience.

With the foregoing in mind, FIG. 1 is schematic diagram of an attraction system 100 for minting customized non-fungible tokens (NFTs) in an amusement park attraction 102 (e.g., an interactive attraction area). The amusement park attraction 102 may be a recreational or themed environment, a ride, or another suitable attraction configured to interactively entertain one or more users 104. The amusement park attraction 102 may include one or more sensors 106 to monitor the users 104. The sensors 106 may be cameras, infrared cameras, light detection and ranging (LiDAR) sensors, radio detecting and ranging (radar) sensors, radio-frequency identification (RFID) sensors, facial recognition cameras, motion characteristic sensors, identity sensors, or the like. The sensors 106 may be installed at various locations in the amusement park attraction 102. The sensors 106 may detect one or more attributes of the user 104, such as body temperature, gait, posture, facial structure, skeletal structure, speech, apparel, accessories, or the like. The sensors 106 may also detect an activity being performed by the user 104. The activity may be a motion, a spoken phrase, or the like. In certain embodiments, the sensors 106 may detect a motion of the user 104 by monitoring the motion of a reference object 108 (e.g., a wand) associated with the user 104. The reference object may include a trackable visual reference, an RFID chip, a motion sensor (e.g., an accelerometer), or a combination thereof. The sensors 106 may track motion of the reference object 108 by monitoring the trackable visual reference, receiving data from the RFID chip, detecting a signal emitted by the motion sensor, including sound or reflected light, or a combination thereof. In other embodiments, the sensors 106 may detect the motion of the user via a user device 110.

The user 104 may perform the activity to interact with one or more environmental elements of the amusement park attraction 102. For example, the amusement park attraction 102 may include an interactive object 112 (e.g., an interactive feature), a lighting system 114, a sound system 116, a pyrotechnics system, a haptic system, a fog system, a projection system, an actuator or motion system, a thermostat system, or any other suitable systems (as generally represented by elements 114 and 116) for manipulating an environment. The interactive object 112 may be an object including a plurality of sensors, actuators, lighting devices, sound devices and the like to produce an effect in response to the activity of the user 104. However, the interactive object 112 may also be an object with more passive features that are trackable features 119 (e.g., an RFID chip, unique shape, or reflective material). In an embodiment, the interactive object 112 may include one or more RFID chips configured to store data. In certain embodiments, the user may activate the interactive object 112 by performing the action via the reference object 108. For example, the user 104 may manipulate the reference object 108 to draw a certain shape 113 in the air (i.e., perform a gesture), or make contact with the interactive object 112. In response, the interactive object 112 may produce an effect. The effect may be a motion effect, a lighting effect, a sound effect, a haptic effect, a digital effect communicated via the user device 110, or a combination thereof. The interactive object 112 may produce different effects in response to the user 104 drawing different shapes in the air with the reference object 108, or in response to the user 104 contacting different spots on the interactive object 112 with the reference object 108. In other embodiments, the activity may be a virtual activity performed by the user partially or fully in a game or application on the user device 110. For example, the activity may be collecting a virtual item, defeating a virtual enemy, solving a virtual puzzle, capturing a virtual character, or the like, including through use of a camera onboard the user device or near field communication. In certain embodiments, the activity of the user 104 may prompt effects caused by the lighting system 114, the sound system 116, or both. The lighting system 114 may be a plurality of lighting devices. The sound system 116 may be a plurality of speakers. Additionally, the activity may prompt environmental changes of the amusement park attraction 102, such as changing a soundtrack, opening a new area or level 117, or the like. The environmental effects may be operated by a controller 118.

The controller 118 may include one or more processors 120 and a memory 122. The one or more processors 120 may be any type of computer processors or microprocessors capable of executing computer-executable code. The one or more processors 120 may perform the operations described below. The memory 122, which may include multiple separate memory components, may be include suitable articles of manufacture that can serve as media to store processor-executable code, data, or the like. These articles of manufacture may represent computer-readable media (e.g., any suitable form of memory or storage) that may store the processor-executable code used by the one or more processor 120 to perform the presently disclosed techniques. The memory 122 may also be used to store data, various other software applications for analyzing the data, and the like. The memory 122 may represent non-transitory computer-readable media (e.g., any suitable form of physical memory or storage) that may store the processor-executable code used by the one or more processors 120 to perform various techniques described herein. It should be noted that non-transitory merely indicates that the media is tangible and not a signal.

The controller 118 may operate the amusement park attraction 102 to perform one of the one more effects described above. For example, the controller may receive data (e.g., an indication) from the sensors 106 indicative of the user 104 performing an activity (e.g., drawing the shape 113 in the air with the reference object 108) to interact with the interactive object 112. The controller may couple to and operate the interactive object 112, the lighting system 114, the sound system 116, the user device 110, or a combination thereof to create an environmental effect in response to the activity. In certain embodiments, the controller 118 may utilize data received from the sensors 106 to identify a user profile (e.g., a user account) associated with the user 104. The user profile may include personal data, park visiting history, transaction history, achievements and scores, digital wallet address, and the like associated with the user 104. The address of the user profile and the address of the user's digital wallet may be stored on the RFID chip of the reference object 108. In certain embodiments, the controller 118 may operate the amusement park attraction based on information of the user profile, which may include information related to a previously acquired NFT. For example, in response to data or an NFT indicating that the user 104 has visited the amusement park attraction 102 in the past, the controller 118 may operate the interactive object 112, the lighting system 114, and the sound system 116 to generate an environmental effect previously unexperienced by the user 104. The controller 118 may also generate media in response to the activity.

The controller 118 may initiate capture of one or more pieces of digital media 124 in response to the activity of the user 104 via the sensors 106. In certain embodiments, the piece of digital media 124 may be an image of a virtual scenario in the game or application. The game or application may be accessed via the user device 110 or another suitable device. In other embodiments the piece of digital media 124 may be a still image or video of the user 104 performing the activity in the amusement park attraction 102. For example, in response to the user 104 drawing a shape in the air with the reference object 108, the controller 118 may operate a camera of the sensors 106 to initiate capture of a still image of the user 104 performing the activity. In certain embodiments, the controller 118 may capture the piece of digital media 124 by retrieving previously recorded data (e.g., historical data) in response to detection of the activity by the sensors 106. For example, imagery of a user may be recorded upon detection of the user 104 (e.g., detection of the user's presence in a particular area) but wait until an activity has been performed before designating a certain portion of the recorded media for capture. In certain embodiments, the activity may be a gesture and when the gesture is detected as complete, the system may go back to capture imagery preceding and during performance of the gesture. Imagery beyond a certain time threshold in the past may be discarded to improve related computer operations. With respect to identifying a gesture, the controller 118 may determine that the gesture, captured by the sensors 106, correlates to a gesture template (e.g., a stored motion path). In certain embodiments, the controller 118 may incorporate augmentation media into the piece of digital media 124. In certain embodiments, the augmentation media may be one or more augmented reality (AR) elements 126 imposed over the still image or video. In other embodiments, the augmentation media may be a graphic that is rendered based on the activity. For example, the AR elements 126 may be rendered in a shape of a movement path of the reference object. For example, the AR elements 126 may include a graphic of a glittering trail depicted in video or still imagery over a path (e.g., a shape of a gesture performed over a time period) traced by the reference object 108. In certain embodiments, the piece of digital media may be pre-generated, and withheld from the user 104 until the user 104 performs the activity. For example, the digital media may consist of a token or an animated virtual character that is collected by the user as a reward for completion of an activity. The AR elements 126 may also correspond to environmental effects (e.g., effects from 114, 116) previously experienced by the user 104. For example, the user 104 may hear noises, feel wind, or see shadows that are later shown through digital media 124 augmented with AR elements 126 to reveal the presence of a virtual character that the user 104 did not perceive at the time of the environmental effects. In accordance with present embodiments, various digital media and digital media modifications may be combined or utilized separately to recognize, reward, and emphasize completion of user activities.

The controller 118 may transmit the piece of digital media 124 to a media library 128 associated with the user 104 based on the capture of the piece of digital media 124. The media library may be a cloud library or a local library (e.g., an album stored on a smart phone). In certain embodiments, the address or location of the media library 128 may be stored in the data associated with the user profile or stored on the RFID chip of the reference object 108. The controller 118 may identify the user 104 and identify the media library 128 associated with the user 104 based on identification data detected by an identity sensor of the sensors 106. The identity sensor may be a facial recognition camera, an RFID sensor, a motion characteristic sensor, or a combination thereof. In certain embodiments, the media library 128 may be a digital wallet. The media library 128 may be accessible by the user 104 via the associated user profile. The user may view the piece of digital media 124 via a display of the user device 110, a display of the amusement park attraction 102, a display on the reference object 108, or the like. The user 104 may access the digital wallet via the user device 110 or the reference object 108 to manipulate the piece of digital media 124. For example, the user 104 may edit, delete, or save the piece of digital media 124 via a user interface of the user device 110 or the reference object 108.

The controller 118 may mint a non-fungible token (NFT) associated with the piece of digital media 124. Upon receipt of the piece of digital media 124 into the media library 128, the user 104 may provide an input (e.g., user instructions) to mint an NFT referencing the piece of digital media 124. This may require payment of a fee. In response, the controller 118 may mint the NFT associated with the piece of digital media based on the user instructions and other requirements (e.g., user identity authentication, payment of a fee). The user 104 may also provide an input to delete the piece of digital media from the media library 128, or to retain the piece of digital media 124 in non-NFT format. In certain embodiments, the controller 118 may mint the NFT based on a digital receipt generated alongside the piece of digital media 124. The controller 118 may delay minting of the NFT to reduce minting cost based on resource availability. The user 104 may keep one or more customized NFTs representing unique experiences at the amusement park attraction 102. Upon minting the NFT, the controller 118 may associate NFT ownership data with the user profile.

In certain embodiments, the controller 118 may detect that the user 104 possesses an NFT indicating previous experiences at the amusement park attraction 102. In response, the controller 118 may operate the amusement park 102 to generate previously unexperienced effects. For example, the controller may analyze the NFT to determine a first effect previously experienced by the user 104. In response to the determination, the controller 118 may generate a second effect that the user 104 has not experienced. In other embodiments, the controller may grant the user 104 access to new areas 117 or levels of the amusement park attraction 102 or other attractions, unlock digital content in a game or application (e.g., new characters, abilities, levels), or grant the user 104 access to other content based on the NFT. The game or application may be accessed via the user device 110, a home video game console, a computing device, or the like. Additionally, the user 104 may buy, sell, or trade the NFTs with other users. For example, the user 104 may purchase an alternative NFT from another user. Royalties may be generated from each NFT transaction. The user 104 may use the alternative NFT to access content in the amusement park attraction 102 or attractions that the user 104 has not visited before. The attraction system 100 may operate a method, as described below.

FIG. 2 illustrates a method 200 for minting customized non-fungible tokens associated with an amusement park attraction in accordance with embodiments of the present disclosure. Although the following description of the method 200 is described in a particular order, it should be noted that the method 200 is not limited to the depicted order; and, instead, the method 200 may be performed in any suitable order. This method 200 (or algorithm) may be performed by the one or more processors 120 of the controller 118, in accordance with present embodiments.

At block 202, the one or more processors 120 may receive a first indication of the activity being performed by the user 104. The first indication may be received from the sensors 106 in response to detecting the user performing the activity (e.g., drawing the shape 113 with the reference object 108, touching the interactive object 112 with the reference object 108). The first indication may indicate a type of activity being performed. The activity may represent the user 104 interacting with the amusement park attraction 102 (e.g., an attraction area). For example, the activity may represent the user 104 forming a gesture (e.g., with the reference object) for detection by a sensor of the amusement park attraction 102. It should be noted that block 202 may represent detecting general activity of the user 104 to initiate a first response (e.g., initiate recording of the user 104) and detecting a more specific activity (e.g., gesture presentation) to initiate as second response (e.g., activation of an effect).

At block 204, the one or more processors 120 may operate an interactive feature of the amusement park attraction 102 (e.g., the attraction area) to produce a first effect. The first effect may be produced in response to the first indication of the activity being performed (e.g., completing a gesture corresponding to a gesture template) by the user 104, as generally represented by block 202. In certain embodiments, the one or more processors 120 may operate the interactive object 112, the lighting system 114, the sound system 116, another suitable effect system, or a combination thereof to produce the first effect. In certain embodiments, the first effect may be a digital effect produced virtually in a game or application. The user may experience the first effect in the game or application via the user device 110 or another suitable device.

At block 206, the one or more processors 120 may initiate capture or collection of the piece of digital media 124 (e.g., a piece of media). Collection of a virtual asset (e.g., virtual character, virtual token), or minting of NFT representing collected virtual asset, may be conveyed to the user through the reference object 108 or user device 110, such as by haptic vibration. The piece of digital media may be customized to represent a unique experience of the user 104. In certain embodiments, the piece of digital media may be a virtual still image or video of an in-game moment in the game or application. In other embodiments, the piece of digital media may be a still image or video of the user 104 performing the activity, as well as the first effect. For example, the user 104 may draw the shape 113 in the air using the reference object 108. A camera of the sensors 106 may capture a video of the user 104 drawing the shape 113 in the air and the corresponding effect. The effect may be the appearance of a virtual character or object depicted on media, and digital media representing the virtual character or object may be captured or collected by the user through the user device 110, reference object 108, or within the associated user media library 128. In certain embodiments, the one or more processors 120 may select the piece of digital media from previously recorded media. The one or more processors 120 may initiate the capture of the piece of digital media 124 based on user activity detection, the first indication of the activity being performed, production of the first effect, or another trigger. This process may include selecting prerecorded data for capture and/or initiating the recording based on detected user activity, predicted user activity, or other operations (e.g., initiation of effects or a high thrill portion of a ride).

At block 208, the one or more processors 120 may incorporate augmentation media into the piece of digital media 124. In certain embodiments, the augmentation media may be the augmented reality (AR) elements 126 imposed over the still image or video. The AR elements may be generated based on the activity. For example, the AR elements 126 may include a shape of a path (e.g., the shape 113) defined by a gesture performed via movement of the reference object 108 as the activity. This may provide an immersive effect to the piece of digital media 124 and increase the value to the user 104 by providing a more impactful and authentic device for memory stimulation. For example, the user 104 may be experiencing augmented reality when the image is captured, wherein a themed character (e.g., a super villain) is depicted via AR goggles being worn by the user 104 as being present in front of the user 104, and the piece of digital media 124 may be modified with the AR elements to present the themed character as present in the scene (e.g., at the location in which the user 104 perceived the themed character).

At block 210, the one or more processors 120 may store the piece of digital media 124 in the media library 128. The media library 128 may be associated with the user profile associated with the user 104. In certain embodiments, the user 104 may access the media library 128 via the user device 110 using log-in information associated with the user profile. The user may access the media library 128 by passing an authentication test. The authentication test may include a biometric input, a personal data query, or the like.

At block 212, the one or more processors 120 may receive an input indicating whether the user 104 wishes to mint a non-fungible token (NFT) associated with the piece of digital media 124. The user may be prompted on a device (e.g., the user device 110) associated with the user profile and the media library to input whether the user 104 wishes to mint an NFT associated with the piece of digital media 124. If the user does not wish to mint an NFT associated with the piece of digital media 124, the method continues to block 214. If the user wishes to mint an NFT associated with the piece of digital media 124, the method continues to block 220.

At block 214, the one or more processors 120 may receive an input determining whether the user wishes to save the piece of digital media 124 or delete the piece of digital media. If the user wishes to save the piece of digital media 124, the method continues to block 216. If the user does not wish to save the piece of digital media 124, the method continues to block 218.

At block 216, the one or more processors 120 may save the piece of digital media 124. In certain embodiments, the piece of digital media 124 may be saved to the media library 128. In other embodiments, the piece of digital media 124 may be saved to a library external to the attraction system 100.

At block 218, the one or more processors 120 may delete the piece of digital media 124. In certain embodiments, in response to the input that the user does not wish to save the piece of digital media 124, the one or more processors 120 may save the piece of digital media 124 in a digital recycle bin for a period of time. During the period of time, the user 104 may retrieve the piece of digital media 124 and save it to the media library 128. At the end of the period of time, the one or more processors may permanently delete the piece of digital media 124.

At block 220, the one or more processors 120 may mint an NFT associated with the piece of digital media and any related data. The one or more processors 120 may mint the NFT by recording the piece of digital media in a distributed ledger associated with a blockchain, hashgraph or similar distributed ledger technology. The one or more processors 120 may store data associated with the NFT (e.g., ownership data, metadata, performance data, smart contracts) in the media library 128, or in a database associated with the user profile. It should be noted that a fee may be required for minting the NFT or for transferring the NFT after it has been minted. Fee payment may be made through a user account or the like and as part of steps 212, 220, or a different step.

At block 222, the one or more processors 120 receive a second indication of the activity being performed. The second indication may be sent by the sensors 106 in response to detecting the user performing the activity (e.g., drawing the shape 113 with the reference object 108, touching the interactive object 112 with the reference object 108) a second time following the minting of the NFT. The second indication may indicate a type of activity being performed. In certain embodiments, the second indication may indicate that the user 104 has performed an alternative activity that is distinct from the activity detected at block 202.

At block 224, the one or more processors 120 may receive a third indication that the user possesses the NFT, which was previously minted. The one or more processors 120 may receive the third indication by traversing the media library 128, the database associated with the user profile, or the like. In certain embodiments, the third indication may indicate that the user 104 is in possession of multiple NFTs. The third indication may indicate one or more attraction experiences that the user 104 has experienced and one or more unexperienced attraction experiences to which the user 104 has access.

At block 226, the one or more processors 120 may enable locked content. In certain embodiments, in response to receiving the second indication and the third indication, the one or more processors 120 may operate the interactive feature of the amusement park attraction 102 to produce a second effect. The second effect may be different than the first effect described at block 204. The one or more processors 120 may operate the interactive object 112, the lighting system 114, the sound system 116, another suitable effect system, or a combination thereof to produce the second effect. In certain embodiments, the second effect may be a digital effect produced virtually in a game or application. The user may experience the second effect in the game or application via, the user device 110, a home video game console, a computing device of the amusement park attraction 102, another type of gaming system, or the like. For example, an authenticator (e.g., a computer-based system that may be in communication with the one or more processors 120 and a gaming system) may operate to confirm authenticity of an NFT in a user account and then (upon confirmed authenticity) facilitate access to a new level in a video game on a console in communication with the authenticator. In other embodiments, in response to receiving the second indication and the third indication, the one or more processors 120 may operate an access feature of the amusement park attraction 102 to give the user 104 access to an interactive area. The access feature may be a locked door, a fog machine that controls visibility of an area, or the like. The interactive area may be a physical area of the amusement park attraction 102 (e.g., the new area or level 117), or a virtual area in the game or application. In further embodiments, in response to receiving the second indication and the third indication, the one or more processors 120 may grant the user 104 access to the physical area and the virtual area.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system of an amusement park, the attraction system comprising:

a sensor configured to detect an activity of a user in an interactive attraction area, wherein the activity comprises movement of a reference object; and a controller, comprising one or more processors, wherein the one or more processors is configured to:

receive, from the sensor, an indication of the detected activity;

in response to receiving the indication, operate an interactive feature of the attraction area to produce a first effect;

in response to receiving the indication, initiate capture of a piece of digital media comprising a still image or video via a camera;

modify the piece of digital media based on the detected activity to include one or more augmented reality (AR) elements imposed over the still image or video;

store the modified piece of digital media;

mint a non-fungible token (NFT) associated with the modified piece of digital media;

activate a special effect on the reference object based on the indication of the detected activity;

receive one or more additional indications of the user performing additional activities to interact with the attraction area using the reference object; and grant access to a virtual area in a game or application or a physical area of the interactive attraction area based on receiving the one or more additional indications and confirmation of the NFT being associated with the user.

2. The attraction system of claim 1, wherein the one or more processors is configured to identify the user and a media library associated with the user based on identification data detected by an identity sensor.

3. The attraction system of claim 2, wherein the identity sensor comprises a facial recognition camera, a radio-frequency identification (RFID) sensor, a motion characteristic sensor, or a combination thereof.

4. The attraction system of claim 2, wherein the one or more processors is configured to transmit the piece of digital media to the media library associated with the user based on capture of the piece of digital media.

5. The attraction system of claim 1, wherein the sensor is one of a plurality of sensors configured to detect the activity by monitoring a reference object associated with the user.

6. The attraction system of claim 5, wherein the reference object comprises an RFID chip storing data associated with an account of the user.

7. The attraction system of claim 5, wherein the sensor is configured to detect a signal emitted by a motion sensor of the reference object.

8. The attraction system of claim 1, wherein the piece of digital media comprises an image or video of the user performing the activity.

9. The attraction system of claim 8, wherein the one or more processors is configured to capture the piece of digital media by retrieving previously recorded data in response to detection of the activity by the sensor.

10. The attraction system of claim 9, wherein the activity comprises a gesture that correlates to a gesture template.

11. The attraction system of claim 1, wherein the one or more processors is configured to incorporate augmentation media into the piece of digital media.

12. The attraction system of claim 1, wherein the one or more processors is configured to:

control a lighting system, a sound system, or a combination thereof to produce the first effect concurrently with capturing the piece of digital media.

13. The attraction system of claim 12, wherein the one or more processors is further configured to:

determine that the indication of the detected activity is associated with a movement of the reference object; and activate the first effect based on the determination.

14. The attraction system of claim 13, wherein the one or more processors is further configured to:

modify the piece of digital media with an overlaid shape based on the indication of the detected activity.

15. A method for operating an attraction system of an amusement park, the method comprising:

receiving, via a sensor, an indication of a user of an attraction performing an activity, wherein the activity comprises interacting with an attraction area using a reference object;

in response to receiving the indication, operating an interactive feature of the attraction area to produce a first effect via a controller;

initiating, via a camera, capture of a piece of media representative of the user performing the activity and the first effect, wherein the piece of media comprises a still image or video;

incorporating, via the controller, augmentation media into the piece of media, wherein the augmentation media comprises one or more augmented reality (AR) elements imposed over the still image or video;

storing the piece of media in a media library associated with the user;

receiving a user input indicating that the user would like to mint a non-fungible token (NFT) associated with the piece of media;

minting, via the controller, the NFT associated with the piece of media;

activating a special effect on the reference object based on the indication of the activity;

receiving one or more additional indications of the user performing additional activities to interact with the attraction area using the reference object; and granting the user access to a physical or virtual space based on receiving the one or more additional indications and the NFT being associated with the user.

16. The method of claim 15, comprising:

receiving, via the sensor, a second indication of the user performing the activity;

receiving a third indication that the user possesses the NFT; and in response to receiving the second indication and the third indication, operating the interactive feature to produce a second effect via the controller, wherein the second effect is different than the first effect.

17. The method of claim 15, comprising generating the AR elements based on the activity.

18. The method of claim 17, comprising generating the AR elements to include a shape of a path defined by a gesture performed with the reference object as the activity.

19. The method of claim 15, wherein initiating capture of the piece of media comprises selecting media from previously recorded media.

20. An entertainment system, comprising:

a sensor configured to detect an activity of a user in an interactive attraction area, wherein the activity comprises movement of a reference object; and a controller, comprising one or more processors, wherein the one or more processors is configured to:

receive, from the sensor, an indication of the user performing the activity;

in response to receiving the indication, initiate capture of a piece of digital media via a camera;

mint a non-fungible token (NFT) associated with the piece of digital media;

authenticate the NFT in response to a request from a game system;

activate a special effect on the reference object based on the indication of the activity;

receive, from the sensor, a second indication of the user performing the activity; and in response to receiving the second indication and the authenticated NFT, grant the user access to locked content in a game of the game system.

21. The entertainment system of claim 20, comprising the game system, wherein the game system comprises a gaming console communicatively coupled to the controller and wherein the game system is configured to enable additional content based on authentication of the NFT by an authenticator.

* * * * *